US011645216B2

(12) United States Patent
Lambert et al.

(10) Patent No.: US 11,645,216 B2
(45) Date of Patent: *May 9, 2023

(54) SYSTEMS AND METHODS FOR SINGLE-WIRE IN-BAND PULSE-ADDRESSABLE MULTIPLEXER

(71) Applicant: Dell Products L.P., Round Rock, TX (US)

(72) Inventors: Timothy M. Lambert, Austin, TX (US); Michael J. Stumpf, Cedar Park, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,434

(22) Filed: Nov. 30, 2020

(65) Prior Publication Data

US 2022/0171729 A1 Jun. 2, 2022

(51) Int. Cl.
*G06F 13/374* (2006.01)
*G06F 13/28* (2006.01)
*G06F 13/362* (2006.01)
*G06F 13/38* (2006.01)

(52) U.S. Cl.
CPC .......... *G06F 13/374* (2013.01); *G06F 13/287* (2013.01); *G06F 13/362* (2013.01); *G06F 13/385* (2013.01)

(58) Field of Classification Search
CPC .... G06F 13/374; G06F 13/287; G06F 13/362; G06F 13/385
See application file for complete search history.

(56) References Cited

U.S. PATENT DOCUMENTS

| | | | |
|---|---|---|---|
| 6,449,732 B1 * | 9/2002 | Rasmussen | G05B 9/03 713/400 |
| 8,943,254 B2 * | 1/2015 | Tailliet | G06F 13/4295 710/306 |
| 2003/0065851 A1 * | 4/2003 | Layman | H04W 28/06 710/260 |
| 2004/0148461 A1 * | 7/2004 | Steinmetz | G06F 3/0661 711/114 |
| 2008/0028157 A1 * | 1/2008 | Steinmetz | H04L 49/253 711/149 |
| 2009/0161588 A1 * | 6/2009 | Maldonado | H04B 1/40 370/311 |

(Continued)

*Primary Examiner* — Henry Tsai
*Assistant Examiner* — Aurangzeb Hassan
(74) *Attorney, Agent, or Firm* — Jackson Walker L.L.P.

(57) ABSTRACT

An information handling system may include a bus initiator, a plurality of bus endpoints, and a single-wire bus communicatively coupled between the bus initiator and the plurality of bus endpoints, wherein the bus comprises a multiplexer. The bus initiator may be configured to perform in-band addressing to select a communications channel through the multiplexer via an addressing protocol that uses pulse bursts for initiation of the addressing, identification of the communications channel, and termination of the addressing. Pulses of the pulse bursts may be sufficiently short in duration to pass through filters of the bus endpoints such that the pulse bursts are not processed by the bus endpoints.

21 Claims, 4 Drawing Sheets

(56) References Cited

U.S. PATENT DOCUMENTS

| | | | | |
|---|---|---|---|---|
| 2011/0022756 A1* | 1/2011 | Catherwood | ....... | G06F 13/1605 |
| | | | | 710/116 |
| 2011/0072184 A1* | 3/2011 | Tateyama | .............. | G06F 13/385 |
| | | | | 710/308 |
| 2011/0153899 A1* | 6/2011 | Aldereguia | ........... | G06F 13/385 |
| | | | | 710/313 |
| 2014/0189187 A1* | 7/2014 | Acharya | ............... | G06F 13/385 |
| | | | | 710/310 |
| 2014/0375359 A1* | 12/2014 | Deloge | ................ | G06F 13/385 |
| | | | | 327/108 |
| 2020/0334185 A1* | 10/2020 | Ngo | .................... | G06F 13/4027 |

* cited by examiner

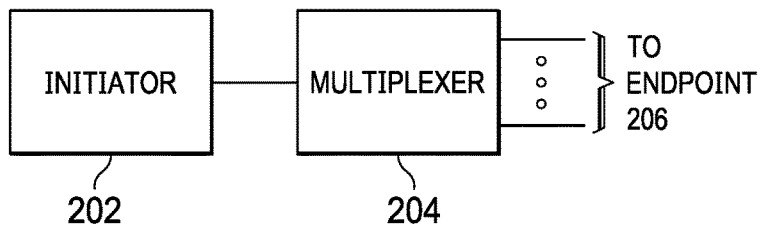
FIG. 2
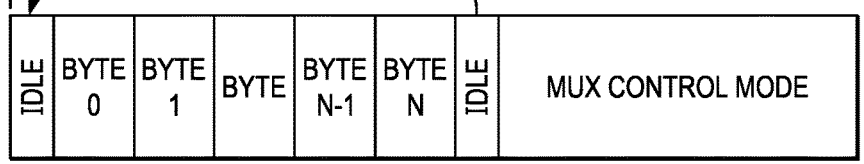
FIG. 3
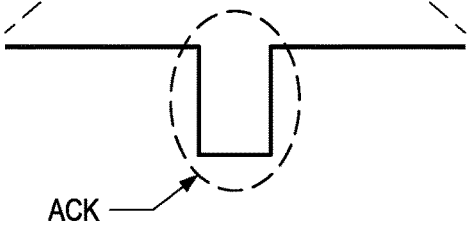

SYSTEMS AND METHODS FOR SINGLE-WIRE IN-BAND PULSE-ADDRESSABLE MULTIPLEXER

TECHNICAL FIELD

The present disclosure relates in general to information handling systems, and more particularly to methods and systems for implementing a single-wire, in-band, pulse-addressable multiplexer in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more communications buses, including without limitation one or more single-wire buses. For example, a single-wire bus may include a Secure Digital Input/Output (SDIO) bus or 1-Wire bus. To route communication to a desired target device on a single-wire bus, a communication must often be communicated through one or more multiplexers to reach the target device. Using a traditional multiplexer for switching such bus communication may require numerous pins for selecting a multiplexer path, thus leading to high cost, minimized density, and minimized communication bandwidth.

SUMMARY

In accordance with the teachings of the present disclosure, the disadvantages and problems associated with existing approaches to bus communication may be reduced or eliminated.

In accordance with embodiments of the present disclosure, an information handling system may include a bus initiator, a plurality of bus endpoints, and a single-wire bus communicatively coupled between the bus initiator and the plurality of bus endpoints, wherein the bus comprises a multiplexer. The bus initiator may be configured to perform in-band addressing to select a communications channel through the multiplexer via an addressing protocol that uses pulse bursts for initiation of the addressing, identification of the communications channel, and termination of the addressing. Pulses of the pulse bursts may be sufficiently short in duration to pass through filters of the bus endpoints such that the pulse bursts are not processed by the bus endpoints.

In accordance with these and other embodiments of the present disclosure, a method may include, in an information handling system comprising a bus initiator, a plurality of bus endpoints, and a single-wire bus communicatively coupled between the bus initiator and the plurality of bus endpoints, wherein the bus comprises a multiplexer: performing, by the bus initiator, in-band addressing to select a communications channel through the multiplexer via an addressing protocol that uses pulse bursts for initiation of the addressing, identification of the communications channel, and termination of the addressing. Pulses of the pulse bursts may be sufficiently short in duration to pass through filters of the bus endpoints such that the pulse bursts are not processed by the bus endpoints.

In accordance with these and other embodiments of the present disclosure, a multiplexer for use in a single-wire bus may include an single-wire bus input, a plurality of downstream channels, and logic configured to select a communications channel through the multiplexer via an addressing protocol that uses pulse bursts received from a bus initiator via the single-wire bus input for initiation of the addressing, identification of the communications channel, and termination of the addressing. Pulses of the pulse bursts may be sufficiently short in duration to pass through filters of bus endpoints communicatively coupled to the downstream channels such that the pulse bursts are not processed by the bus endpoints.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a block diagram of an example I2C multiplexer topology, in accordance with embodiments of the present disclosure;

FIG. 3 illustrates contents of example traffic communicated during a discovery mode of a communication protocol, in accordance with embodiments of the present disclosure;

DETAILED DESCRIPTION

Preferred embodiments and their advantages are best understood by reference to FIGS. 1 through 5 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
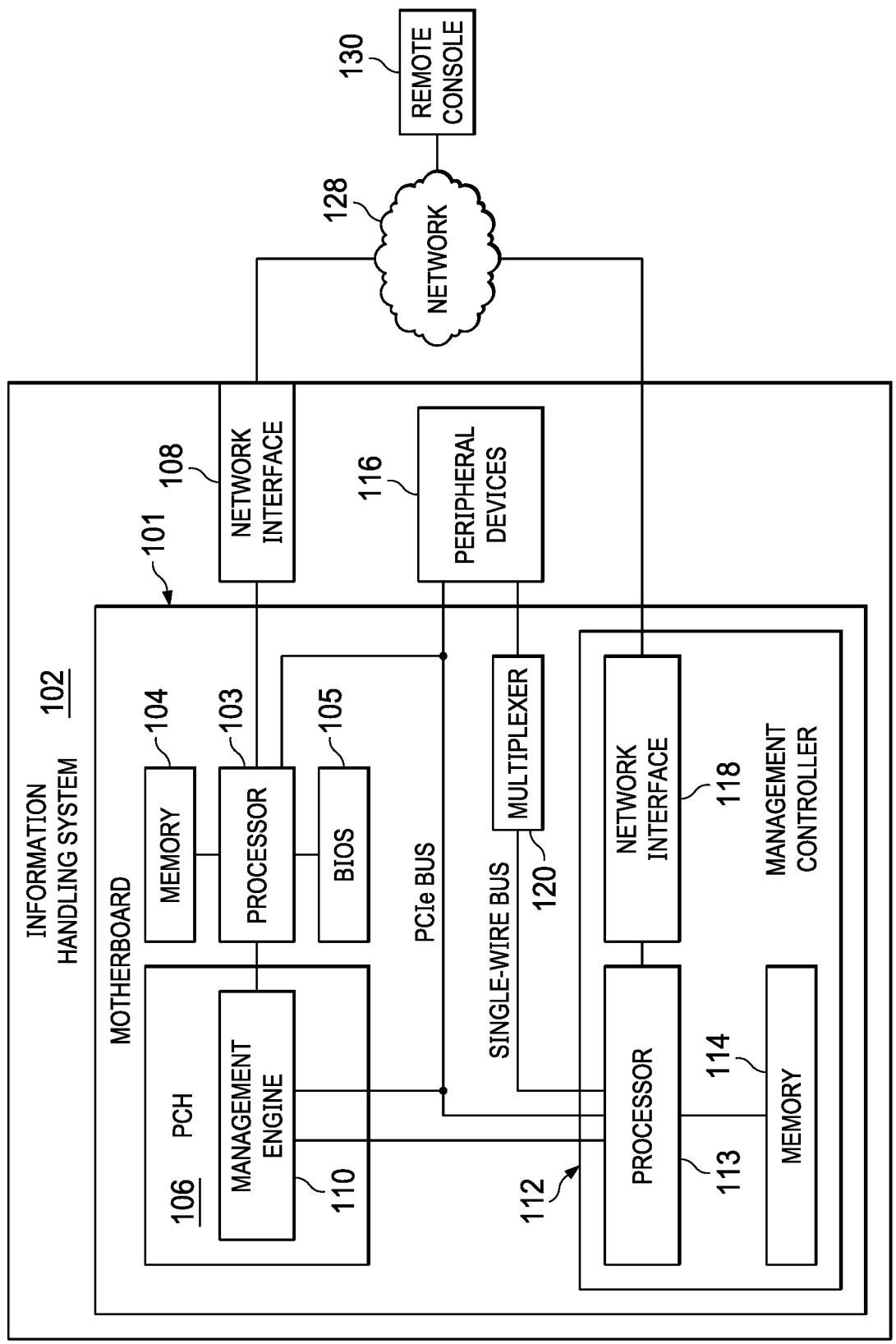
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and one or more peripheral devices 116 communicatively coupled to processor 103.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology. In these and other embodiments, firmware components of management engine 110 may be stored as a part of BIOS 105 on a read-only memory of information handling system 102.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112, network 128, and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102, network 128, and/or one or more other information handling systems. Network interface 108 may enable information handling system 102 to communicate using any suitable transmission protocol and/or standard. In these and other embodiments, network interface 108 may comprise a network interface card, or "NIC."

Each peripheral device 116 may be communicatively coupled to processor 103 and may generally include any information handling resource. As shown in FIG. 1, peripheral devices 116 may also be coupled to processor 113 via a single-wire bus and/or via a PCIe bus. Processor 113 can communicate directly to peripheral devices 116 via PCIe except for some messages that require a PCIe root complex. For these messages, management engine 110 may serve as a proxy between processor 113 and peripheral devices 116. Furthermore, in these and other embodiments, processor 113 may comprise a single-wire bus initiator to facilitate single-wire communication between processor 113 and peripheral devices 116.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with management controller 112 via network interface 118 in order to facilitate remote management of information handling system 102 by remote console 130. In some embodiments, such remote management may be in accordance with Intelligent Platform Management Interface (IPMI) and/or another suitable interface or standard.

As shown in FIG. 1, the single-wire bus between processor 113 and peripheral devices 116 may include a multiplexer 120 for selecting a path between processor 113 and an endpoint peripheral device 116. FIG. 2 illustrates a block diagram of an example multiplexer topology 200, in accordance with embodiments of the present disclosure. As shown in FIG. 2, multiplexer topology 200 may include an initiator 202 (e.g., processor 113 of management controller 112) and a multiplexer 204 (e.g., multiplexer 120) interfaced between initiator 202 and a plurality of endpoints 206 (e.g., peripheral devices 116).

As described in greater detail below, initiator 202 may be configured to generate in-band pulsed commands on the single-wire bus (e.g., pulses on the single-wire data line for the single-wire bus) as opposed to addressing on out-of-band multiplexer select lines, in order to provide in-band addressing of multiplexer 204 and the ultimate endpoint 206 for a particular single-wire communication. Such pulsed commands may issue from initiator 202 and traverse a path from initiator 202 to an endpoint 206 in a manner that:

may be short enough in pulse width so as to not pass through glitch filters of an endpoint device 206 such that the pulses are not seen by the endpoint device; and may not significantly affect protocol efficiency.

To illustrate the in-band pulse-addressing scheme enabled by the systems and methods described herein, reference is made to FIG. 3 that depicts transition from a discovery mode to a control mode in accordance with a communications protocol for the single-wire bus.

As shown in FIG. 3, in a discovery mode of the communications protocol, initiator 202 may wait for an idle period, send a multi-byte payload, and then continue to repeat the steps of waiting for an idle period and sending the multi-byte payload until initiator 202 communicates an acknowledgement ACK onto the single-wire bus during an idle period. As mentioned above, such acknowledgement ACK may be short enough in pulse width so as to not pass through glitch filters of an endpoint device 206 such that the pulse is not seen by any endpoint device 206. However, such pulse may be observable by multiplexer 204, and multiplexer 204 may transition from the discovery mode to the control mode in response to observing acknowledgement ACK.

Figure 4:
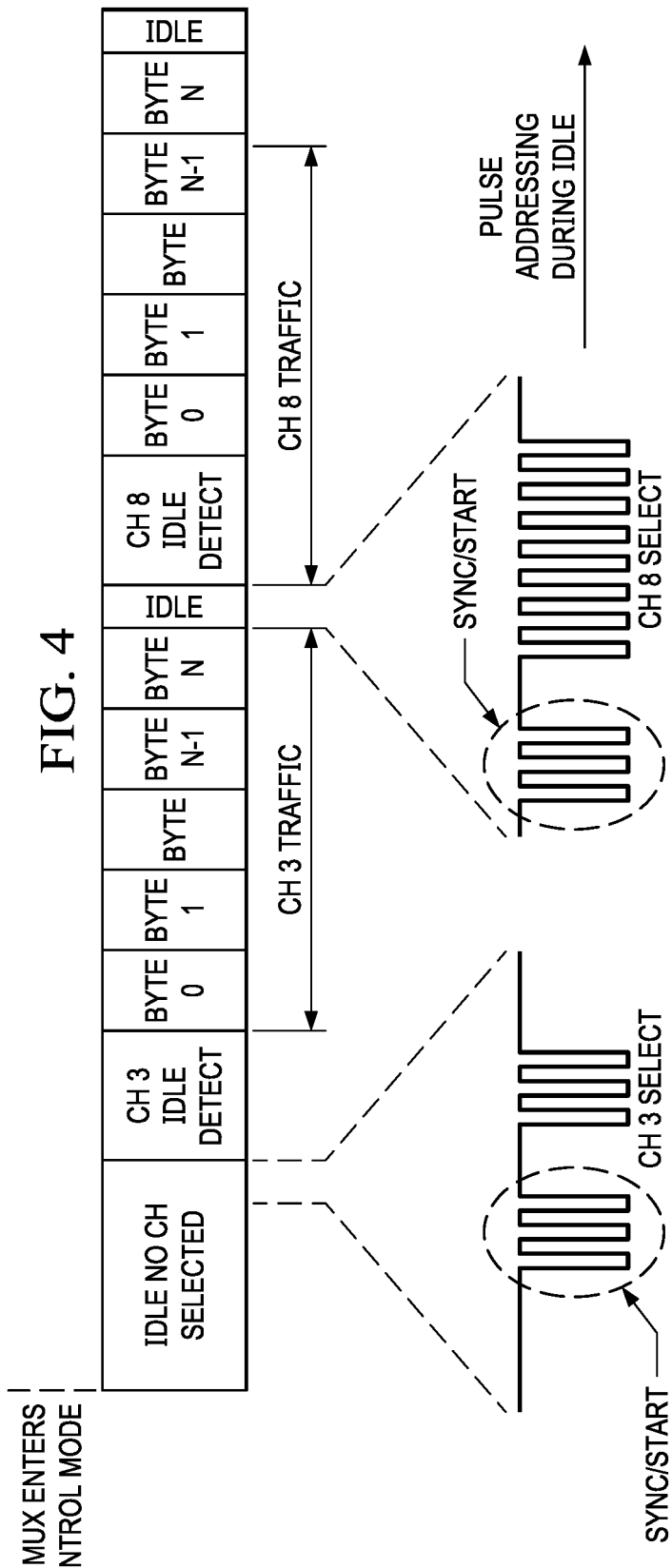
FIG. 4 illustrates contents of example traffic communicated during a control mode of a communication protocol, in accordance with embodiments of the present disclosure.

Once in the control mode, traffic communicated from initiator 202 to multiplexer 204 may reflect a selected channel of multiplexer 204. For example, as shown in FIG. 4, the control mode may remain in an idle state until such time as initiator 202 issues a synchronization/start (SYNC/START) pulse burst on the single-wire bus (e.g., three symmetrical low-going pulses) followed by a burst of pulses indicating a downstream channel of multiplexer 204 to be selected. For example, a selected channel for multiplexer 204 may be indicated by a number of pulse bursts generated on the single-wire bus within a timeout period after the SYNC/START) pulse burst. Thus, the three low-going pulses generated on the single-wire bus after the SYNC/START pulse burst in FIG. 4 may indicate a selection of multiplexer channel 3. As mentioned above, such pulses may be short enough in pulse width so as to not pass through glitch filters of an endpoint device 206 such that the pulse is not seen by any endpoint device 206, but such pulses may be observable by multiplexer 204.

Once a particular channel is selected, all subsequent traffic transmitted from initiator 202 to multiplexer 204 may be further transmitted to the endpoint 206 on the selected channel. Any new channel selections may occur during a subsequent idle period of the communication protocol of the single-wire bus. For example, as shown in FIG. 4, following selection of channel 3 as the downstream channel of multiplexer 204, in a subsequent idle period, initiator 202 may issue another SYNC/START pulse burst on the single-wire bus (e.g., three symmetrical low-going pulses) followed by a burst of pulses indicating a downstream channel of multiplexer 204 to be selected (e.g., eight low-going pulses indicating selection of channel 8).

Figure 5:
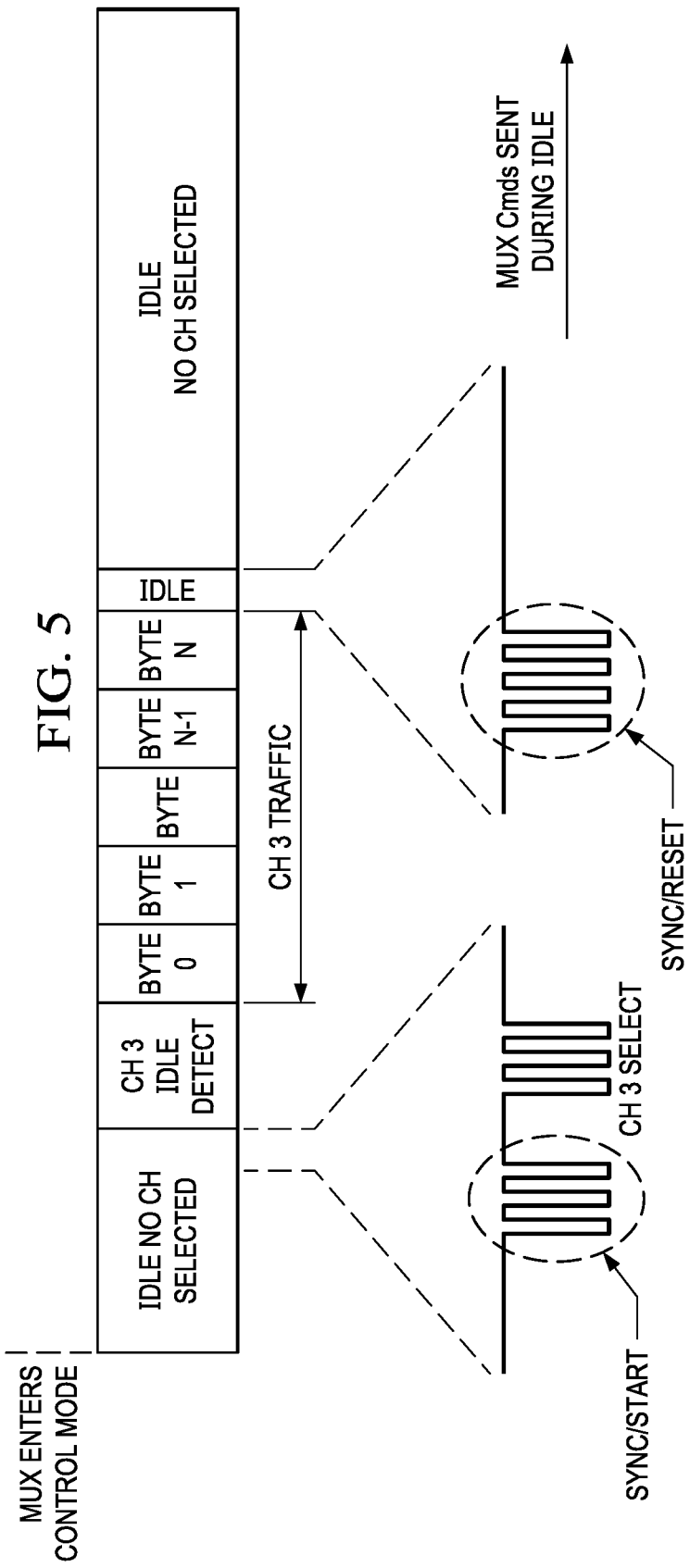
FIG. 5 illustrates contents of example traffic communicated during a control mode of a communication protocol to reset a channel selection, in accordance with embodiments of the present disclosure.

To reset channel selection such that no channel is selected, initiator 202 may issue a synchronization/reset (SYNC/RESET) pulse burst on the single-wire bus (e.g., four symmetrical low-going pulses) during an idle period of the communications protocol. For example, as shown in FIG. 5, following selection of channel 3 as the downstream channel of multiplexer 204, in a subsequent idle period, initiator 202 may issue a SYNC/RESET pulse burst on the single-wire bus (e.g., four symmetrical low-going pulses) indicating a reset of the previous channel selection.

The systems and methods described above may provide numerous advantages. For example, the systems and methods described above may eliminate the need for bus-addressable multiplexers and complex bus selection logic, while increasing component density and reducing pin count and hardware logic, as compared to traditional approaches.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a bus initiator;
a plurality of bus endpoints; and
a single-wire bus communicatively coupled between the bus initiator and the plurality of bus endpoints, wherein the bus comprises a multiplexer;
wherein:

the bus initiator is configured to perform in-band addressing to select a communications channel through the multiplexer via an addressing protocol that uses pulse bursts for initiation of the addressing, identification of the communications channel, and termination of the addressing; and pulses of the pulse bursts are sufficiently short in duration to pass through filters of the bus endpoints such that the pulse bursts are not processed by the bus endpoints.

2. The information handling system of claim 1, wherein the bus initiator is a management controller for performing out-of-band management of the information handling system.

3. The information handling system of claim 1, wherein each of the bus endpoints comprises a peripheral device of the information handling system.

4. The information handling system of claim 1, wherein the multiplexer is configured to:
receive the pulse bursts;
extract from the pulse bursts a pulse burst for selecting a downstream channel of the at least one multiplexer; and
communicate traffic via the downstream channel responsive to selection of the downstream channel.

5. The information handling system of claim 1, wherein the bus initiator is configured to transition the multiplexer from a discovery mode to a control mode for addressing by communicating an acknowledgment signal via the single-wire bus.

6. The information handling system of claim 5, wherein the bus initiator is configured to communicate the acknowledgment signal during an idle period of a single-wire communications protocol.

7. The information handling system of claim 1, wherein the bus initiator is configured to communicate pulse bursts for initiation of the addressing during an idle period of a single-wire communications protocol.

8. A method comprising, in an information handling system comprising a bus initiator, a plurality of bus endpoints, and a single-wire bus communicatively coupled between the bus initiator and the plurality of bus endpoints, wherein the bus comprises a multiplexer:
performing, by the bus initiator, in-band addressing to select a communications channel through the multiplexer via an addressing protocol that uses pulse bursts for initiation of the addressing, identification of the communications channel, and termination of the addressing;
wherein pulses of the pulse bursts are sufficiently short in duration to pass through filters of the bus endpoints such that the pulse bursts are not processed by the bus endpoints.

9. The method of claim 8, wherein the bus initiator is a management controller for performing out-of-band management of the information handling system.

10. The method of claim 8, wherein each of the bus endpoints comprises a peripheral device of the information handling system.

11. The method of claim 8, further comprising, by the multiplexer:
receiving the pulse bursts;
extracting from the pulse bursts a pulse burst for selecting a downstream channel of the at least one multiplexer; and
communicating traffic via the downstream channel responsive to selection of the downstream channel.

12. The method of claim 8, further comprising transitioning the multiplexer from a discovery mode to a control mode for addressing by communicating an acknowledgment signal from the bus initiator via the single-wire bus.

13. The method of claim 12, further comprising communicating the acknowledgment signal during an idle period of a single-wire communications protocol.

14. The method of claim 8, further comprising communicating, from the bus initiator, pulse bursts for initiation of the addressing during an idle period of a single-wire communications protocol.

15. A multiplexer for use in a single-wire bus, the multiplexer comprising:
an single-wire bus input;
a plurality of downstream channels; and
logic configured to select a communications channel through the multiplexer via an addressing protocol that uses pulse bursts received from a bus initiator via the single-wire bus input for initiation of the addressing, identification of the communications channel, and termination of the addressing;
wherein pulses of the pulse bursts are sufficiently short in duration to pass through filters of bus endpoints communicatively coupled to the downstream channels such that the pulse bursts are not processed by the bus endpoints.

16. The multiplexer of claim 15, wherein the bus initiator is a management controller for performing out-of-band management of the information handling system.

17. The multiplexer of claim 15, wherein each of the bus endpoints comprise a peripheral device of an information handling system.

18. The multiplexer of claim 15, the logic further configured to:
receive the pulse bursts;
extract from the pulse bursts a pulse burst for selecting the downstream channel of the at least one multiplexer; and
communicate traffic via the downstream channel responsive to selection of the downstream channel.

19. The multiplexer of claim 15, the logic further configured to transition the multiplexer from a discovery mode to a control mode for addressing in response to receiving an acknowledgment signal via the single-wire bus.

20. The multiplexer of claim 19, wherein the acknowledgment signal is received at the single-wire bus input during an idle period of a single-wire communications protocol.

21. The multiplexer of claim 15, wherein the pulse bursts for initiation of the addressing are received at the single-wire bus input during an idle period of a single-wire communications protocol.

* * * * *

UNITED STATES PATENT AND TRADEMARK OFFICE
CERTIFICATE OF CORRECTION

| | |
|---|---|
| PATENT NO. | : 11,645,216 B2 |
| APPLICATION NO. | : 17/106434 |
| DATED | : May 9, 2023 |
| INVENTOR(S) | : Lambert et al. |

It is certified that error appears in the above-identified patent and that said Letters Patent is hereby corrected as shown below:

In the Claims

In Column 9, Line 22, Claim 4 delete "at least one", therefor.

In Column 10, Line 3, Claim 11 delete "at least one", therefor.

Signed and Sealed this
Thirteenth Day of June, 2023

*Katherine Kelly Vidal*

Katherine Kelly Vidal
*Director of the United States Patent and Trademark Office*